(12) United States Patent
Oga et al.

(10) Patent No.: US 7,938,371 B2
(45) Date of Patent: May 10, 2011

(54) WIRING HOLDING UNIT

(75) Inventors: Tatsuya Oga, Kosai (JP); Akihito Tsukamoto, Toyota (JP); Masahiro Takamatsu, Toyota (JP); Koji Nomura, Toyota (JP)

(73) Assignee: Yazaki Corporation, Tokyo (JP)

( * ) Notice: Subject to any disclaimer, the term of this patent is extended or adjusted under 35 U.S.C. 154(b) by 160 days.

(21) Appl. No.: 11/633,470

(22) Filed: Dec. 5, 2006

(65) Prior Publication Data
US 2007/0128929 A1    Jun. 7, 2007

(30) Foreign Application Priority Data
Dec. 5, 2005    (JP) ................................ 2005-350337

(51) Int. Cl.
*F16L 3/08* (2006.01)

(52) U.S. Cl. .......... 248/74.4; 248/55; 248/65; 248/67.5; 248/74.1; 248/73

(58) Field of Classification Search ............ 248/55, 248/65, 67.5, 74.1, 74.4, 73
See application file for complete search history.

(56) References Cited

U.S. PATENT DOCUMENTS

| | | | | | |
|---|---|---|---|---|---|
| 1,518,848 | A | * | 12/1924 | Hickox | 248/74.4 |
| 3,061,253 | A | * | 10/1962 | Keaton | 248/74.1 |
| 3,080,140 | A | * | 3/1963 | Gohs et al. | 248/74.1 |
| 4,082,094 | A | * | 4/1978 | Dailey | 604/93.01 |
| 4,240,604 | A | * | 12/1980 | Brach | 248/316.5 |
| 4,470,622 | A | * | 9/1984 | Pate et al. | 285/419 |
| 4,490,888 | A | * | 1/1985 | Levant | 24/20 R |
| 4,614,321 | A | * | 9/1986 | Andre | 248/74.2 |
| 4,804,158 | A | * | 2/1989 | Collins et al. | 248/74.4 |
| 5,384,936 | A | * | 1/1995 | Van Walraven | 24/279 |
| 5,390,876 | A | * | 2/1995 | Hatano et al. | 248/73 |
| 6,030,006 | A | * | 2/2000 | Lin | 285/411 |
| 6,126,119 | A | * | 10/2000 | Giangrasso | 248/58 |
| 6,164,604 | A | * | 12/2000 | Cirino et al. | 248/74.3 |
| 6,376,777 | B1 | * | 4/2002 | Ito et al. | 174/152 G |
| 6,595,473 | B2 | * | 7/2003 | Aoki et al. | 248/74.4 |
| 6,666,415 | B2 | * | 12/2003 | Hansen | 248/74.3 |
| 6,682,026 | B2 | * | 1/2004 | Nagayasu | 248/74.2 |
| 6,717,055 | B2 | * | 4/2004 | Kato | 174/72 A |

(Continued)

FOREIGN PATENT DOCUMENTS

JP      56-118526 U     9/1981

(Continued)

OTHER PUBLICATIONS

Japanese Office Action dated Aug. 26, 2009 (Japanese Application No. 2005-350337).

*Primary Examiner* — Anita M King
*Assistant Examiner* — Nkeisha J Smith
(74) *Attorney, Agent, or Firm* — Sughrue Mion, PLLC (57) ABSTRACT

A wiring holding unit for holding a tubular receiving member receiving wiring therein includes a gripping member including a pair of gripping portions for gripping the receiving member, and a movable portion interconnecting the pair of gripping portions such that the pair of gripping portions are movable, and a fitting/fixing member which is separate from the gripping member, and is moved toward the gripping member in a direction generally perpendicular to a direction of fixing of the receiving member gripped by the gripping member, and is fitted on the gripping member to be fixed thereto, thereby preventing the pair of gripping portions from moving respectively in directions opposite respectively to gripping directions of the pair of gripping portions.

5 Claims, 7 Drawing Sheets

U.S. PATENT DOCUMENTS

| | | | |
|---|---|---|---|
| 6,732,982 B1 * | 5/2004 | Messinger | 248/74.1 |
| 6,892,990 B2 * | 5/2005 | Pisczak | 248/74.4 |
| 6,968,864 B2 * | 11/2005 | Miyamoto et al. | 138/110 |
| 7,053,311 B2 * | 5/2006 | Santanda | 174/154 |
| 7,392,569 B2 * | 7/2008 | Sharkey et al. | 24/16 R |
| 7,399,922 B2 * | 7/2008 | Oga et al. | 174/72 A |
| 2005/0011996 A1 * | 1/2005 | Geater | 248/71 |
| 2005/0029005 A1 | 2/2005 | Arai | |

FOREIGN PATENT DOCUMENTS

| | | |
|---|---|---|
| JP | 3-73779 U | 7/1991 |
| JP | 7-212936 A | 8/1995 |
| JP | 2004-166403 A | 6/2004 |
| JP | 2005-57968 A | 3/2005 |

* cited by examiner

WIRING HOLDING UNIT

BACKGROUND OF THE INVENTION

1. Field of the Invention

This invention relates to a wiring holding unit for holding wiring.

2. Related Art

Various electronic equipments are mounted on an automobile serving as a mobile body. Therefore, wire harnesses are installed in the automobile so as to supply electric power from a power source or the like to the electronic equipments and also to transmit control signals from a computer or the like to the electronic equipments. The wire harness comprises a plurality of wires, and connectors secured to end portions of the wires.

The wire comprises an electrically-conductive conductor, and a sheath portion which is made of an insulative synthetic resin and covers the conductor. The wire is a so-called sheathed wire. The connector comprises electrically-conductive metal terminals, and an insulative connector housing. The metal terminal is secured to the end portion or other portion of the wire, and is electrically connected to the conductor of the wire. The connector housing is formed into a box-like shape, and receives the metal terminals.

One example of holding members for the wire harness is the type which holds the wire harness received in a generally cylindrical corrugated tube (see JP-A-2004-166403 Publication). Referring to this wire harness holding member, a plurality of grooves are formed in an outer periphery of the corrugated tube, and the plurality of grooves are arranged at equal intervals in a direction of an axis of the corrugated tube, and each groove is formed over an entire periphery of the corrugated tube. With this construction, the corrugated tube has a generally bellows-shape, and reduces damage applied from other parts to the wire harness.

The holding member has a generally cylindrical shape, and the corrugated tube is passed through the holding member, so that the wire harness is held by the holding member through the corrugated tube. A generally annular plate-like rib is formed within the holding member, and this rib is inserted in the groove of the corrugated tube, thereby preventing the axial movement of the corrugated tube relative to the holding member.

Biting projections are formed within the holding member, and the biting projections bite into the outer periphery of the corrugated tube, thereby preventing the rotation of the corrugated tube relative to the holding member.

Figure 7A:
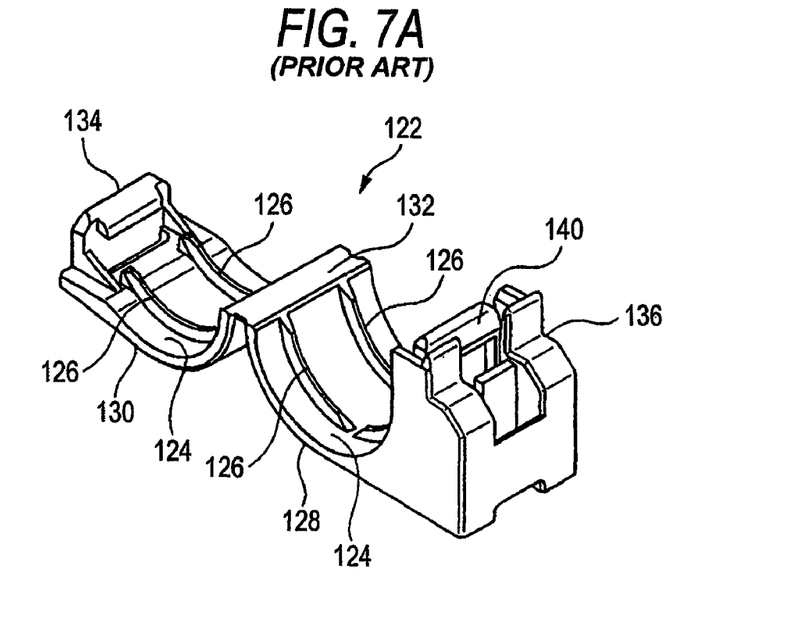
Figure 7B:
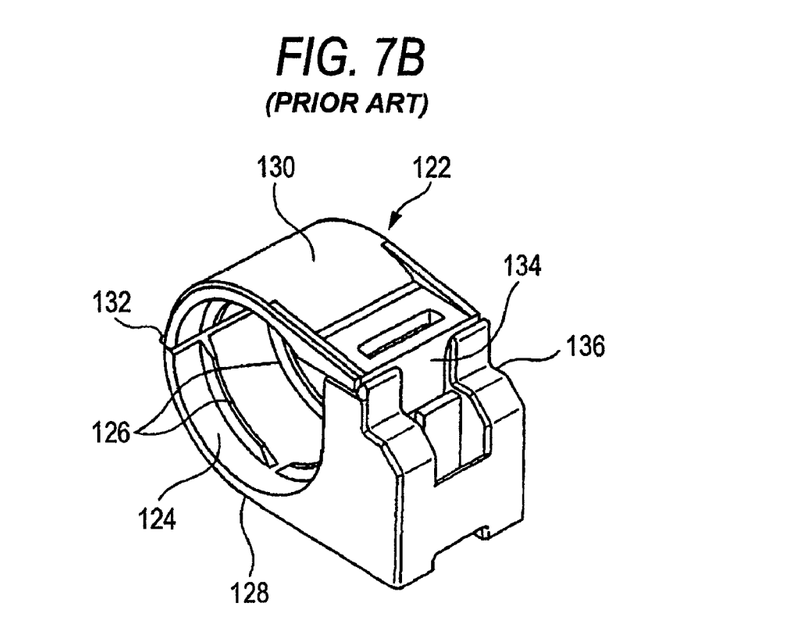

One known corrugated-tube clamp (which corresponds to a gripping member) for the passage of a corrugated tube therethrough is disclosed in JP-A-2004-166403 Publication. As shown in FIG. 7, the corrugated-tube clamp 122 includes a body portion 128 in the form of a plate of a generally C-shaped cross-section, and a pivotal portion 130 in the form of a plate of a generally J-shaped cross-section, and the body portion 128 and the pivotal portion 130 define generally halves of a passage hole 124, respectively. Generally halves of each of limitation plates 126 are formed on the body portion 128 and the pivotal portion 130, respectively.

The corrugated-tube clamp 122 has a hinge portion 132 serving as an engagement portion, and this hinge portion 132 is in the form of a thin plate of a generally U-shaped cross-section (or a thin plate of a generally V-shaped cross-section). One end of the hinge portion 132 is connected to a side end of the passage hole 124 at one end of the body portion 128, while the other end of the hinge portion 132 is connected to a side end of the passage hole 124 at one end of the pivotal portion 130, and therefore the body portion 128 and the pivotal portion 130 are connected together by the hinge portion 132. The hinge portion 132 projects outwardly of the passage hole 124.

A rigid claw 134 is formed integrally on a central portion of the other end portion of the pivotal portion 130, and this rigid claw 134 projects perpendicularly from the other end portion of the pivotal portion 130, and a distal end of the rigid claw 134 projects toward the passage hole 124.

A mounting tube 136 of a generally rectangular tubular shape is formed integrally at the other end of the body portion 128, and an internal hole formed through the mounting tube 136 extends in a direction perpendicular to the direction of the axis of the passage hole 124.

An elastic claw 140 is formed on a side wall of the mounting tube 136 disposed immediately adjacent to the passage hole 124, and a distal end of the elastic claw 140 projects toward the inside of the mounting tube 136 (that is, in a direction away from the passage hole 124). The elastic claw 140 is elastic except its distal end. Here, when the distal end of the elastic claw 140 is pressed by the distal end of the rigid claw 134, the elastic claw 140 is elastically deformed, and the rigid claw 134 is inserted into the mounting tube 136 through one end thereof, so that the distal end of the rigid claw 134 is engaged with (or caught by) the distal end of the elastic claw 140. As a result, the passage hole 124 is closed as shown in FIG. 7B.

The engagement of the distal end of the rigid claw 134 with the distal end of the elastic claw 140 is canceled, and then the pivotal portion 130 is pivotally moved relative to the body portion 128, and by doing so, the passage hole 124 can be opened as shown in FIG. 7A. In this condition, the corrugated tube can be inserted into and removed from the passage hole 124.

In the above corrugated-tube clamp 122, however, the pivotal portion 130 which is opened through the hinge portion 132 is pivotally moved to fit on the cylindrical corrugated tube, and the rigid claw 134 is brought into engagement with the elastic claw 140, so that the corrugated tube is gripped by the body portion 128 and the pivotal portion 130. Therefore, it has been difficult to effect the mounting operation from one direction because of the necessity of the pivotally-moving operation for the pivotal portion 130, etc., and therefore it has been difficult for this structure to meet a demand for an automatic production by a machine.

SUMMARY OF THE INVENTION

With the above problem in view, it is an object of this invention to provide a wiring holding unit which can meet a demand for an automatic production by a machine.

(1) The above object has been achieved by a wiring holding unit of the invention of for holding a receiving member receiving wiring therein; characterized in that the wiring holding unit comprises a gripping member including a pair of gripping portions for gripping the receiving member, and a movable portion interconnecting the pair of gripping portions such that the pair of gripping portions are movable; and a fitting/fixing member which is separate from the gripping member, and is moved toward the gripping member in a direction generally perpendicular to a direction of fixing of the receiving member gripped by the gripping member, and is fitted on the gripping member to be fixed thereto, thereby preventing the pair of gripping portions from moving respectively in directions opposite (or reverse) respectively to gripping directions of the pair of gripping portions.

In the wiring holding unit of the invention, when the pair of gripping portions are moved through the movable portion to grip the receiving member, the gripping member grips the receiving member. The fitting/fixing member is moved toward the gripping member in the direction generally perpendicular to the direction of fixing of the receiving member, and is fitted on the gripping member to be fixed thereto, thereby preventing the pair of gripping portions, gripping the receiving member, from moving respectively in the reverse directions.

(2) In the wiring holding unit of the invention, when the movable portion is pressed by the receiving member, the movable portion may cause the pair of gripping portions to be moved into gripping engagement with the receiving member.

In the wiring holding unit of the invention, when the movable portion is pressed by the receiving member abutting against this movable portion, the pair of gripping portions are moved through the movable portion, and grip the receiving member.

(3) In the wiring holding unit of the invention, the gripping member may include a fixing portion formed on at least one of the pair of gripping portions in continuous relation thereto, and the fixing portion projects outwardly from the fitting/fixing member, fitted on the gripping member, so as to be fixed to a mating member.

In the wiring holding unit of the invention, when the fitting/fixing member is fitted on the gripping member to be fixed thereto, the fixing portion of the gripping member projects outwardly from the fitting/fixing member, and the wiring holding unit is fixed to the mating member through this fixing portion.

(4) In the wiring holding unit of the invention, a limitation device may be provided at least one of the gripping member and the fitting/fixing member, and when the gripping member and the fitting/fixing member are fitted together, the limitation device prevents the fitting/fixing member from moving in a direction away from the gripping member.

In the wiring holding unit of the invention, when the gripping member and the fitting/fixing member are fitted together, the fitting/fixing member is prevented by the limitation device from being moved in the direction away from the gripping member.

As described above, in the wiring holding unit of the invention, the pair of gripping portions are moved through the movable portion to grip the receiving member, and thus the receiving member is gripped by the gripping member, and then the fitting/fixing member is moved toward the gripping member in the direction perpendicular to the direction of fixing of the receiving member, and is fitted on the gripping member to be fixed thereto, thereby preventing the pair of gripping portions, gripping the receiving member, from moving respectively in the reverse directions. Therefore, the direction of fitting of the gripping member and the fitting/fixing member relative to each other can be made the same as the direction of mounting of the receiving member on the gripping member, and therefore the receiving member, the gripping member and the fitting/fixing member can be automatically assembled together by a machine. And besides, the gripping member is fittingly fixed by the fitting/fixing member, and therefore a sufficient retaining force can be obtained regardless of the diameter, cross-sectional shape, etc., of the receiving member. Therefore, there can be provided the wiring holding unit which can meet the demand for the automatic production by the machine.

In the invention, the pair of gripping portions are caused to grip the receiving member when the movable portion of the gripping member is pressed by the receiving member. Therefore, merely by bringing the receiving member into abutting engagement with the movable portion and then by pressing the receiving member, the receiving member can be easily gripped by the gripping member. Therefore, this wire holding unit can more easily meet the demand for the automatic production by the machine.

In the invention, the fixing portion for being fixed to the mating member is formed at the gripping member in such a manner as to project outwardly from the fitting/fixing member. Therefore, the gripping portion of the gripping member is fixed to the mating member through the fixing portion, and therefore the more sufficient retaining force can be obtained.

In the invention, when the gripping member and the fitting/fixing member are fitted together, the fitting/fixing member is prevented by the limitation device from being moved in the direction away from the gripping member. Therefore, the fitting/fixing member is prevented from being disengaged from the gripping member, and therefore the sufficient retaining force can be positively maintained. And besides, it is only necessary to fit the fitting/fixing member on the gripping member, and therefore the wiring holding unit can more easily meet the demand for the automatic production by the machine.

BRIEF DESCRIPTION OF THE DRAWINGS

FIGS. 7A and 7B are views of a conventional corrugated-tube clamp, and FIG. 7A shows a released condition, and FIG. 7B shows a locked condition.

DETAILED DESCRIPTION OF THE PREFERRED EMBODIMENTS

One preferred embodiment of a wiring holding unit of the present invention will now be described with reference to FIGS. 1 to 6.

In FIGS. 1 to 6, the wiring holding unit 1 holds a corrugated tube (receiving member) 2 of a generally oval tubular shape (in which wire harnesses (not shown) serving as wiring are received). This wiring holding unit 1 comprises a gripping member 10 for gripping the corrugated tube 2, and a fitting/fixing member 20 for fitting on the gripping member 10 to fix the same.

As described above, the wire harness comprises a plurality of wires, and connectors secured to end portions of the wires. However, any other suitable type such as one or a plurality of wires or a cable can be used as the wiring.

The corrugated tube 2 is made of a synthetic resin or the like, and is formed into a generally oval tubular shape. The plurality of wire harnesses (serving as the wiring) are passed through and received in the interior of the corrugated tube 2. A plurality of grooves (recesses) 2a each having a square cross-section are formed in an outer peripheral surface of the corrugated tube 2, and the plurality of grooves 2a are arranged at equal intervals in a direction of an axis of the corrugated tube 2, and each groove 2a is formed over an entire periphery of the corrugated tube 2. With this construction, the corrugated tube 2 has a generally bellows-shape, and reduces damage applied from other parts to the wire harness.

The gripping member 10 includes a pair of first and second gripping portions 11 and 12 for gripping the corrugated tube 2, and a hinge portion (movable portion) 13 interconnecting the pair of first and second gripping portions 11 and 12 such that the first and second gripping portions 11 and 12 are movable. These portions are formed integrally with one another using a synthetic resin or the like.

The first gripping portion 11 is in the form of a plate of a generally C-shaped cross-section. The second gripping portion 12 is in the form of a plate of a generally inverted C-shaped cross-section. The first and second gripping portions 11 and 12 define generally halves of a passage hole 14 (for the passage of the corrugated tube 2 therethrough), respectively. The first and second gripping portions 11 and 12, when brought into opposed relation to each other through the hinge portion 13, jointly form the passage hole 14.

Limitation projections 15 are formed on an inner surface (which is to be opposed to the corrugated tube 2) of each of the first and second gripping portions 11 and 12. When the passage hole 14 is formed by these gripping portions 11 and 12, the limitation projections 15 on the first gripping portion 11 are made continuous respectively with the limitation portions 15 on the second gripping portion 12, and these limitation projections 15 are fitted in the grooves 2a of the corrugated tube 2 passed through the passage hole 14, thereby preventing the corrugated tube 2 from being withdrawn from the passage hole 14.

A pair of engagement recesses 11b and 12b are formed respectively in outer surfaces (which are to be opposed to an inner surface of the fitting/fixing member 20) of the first and second gripping portions 11 and 12. Each engagement recess 11b, 12b has a groove-like shape, and extends from the vicinity of one side edge of the gripping portion 11, 12 to the vicinity of the other side edge thereof. Engagement projections 21a and 21b (described later) are engaged in the engagement recesses 11b and 12b, respectively.

When the passage hole 14 is formed by the first and second gripping portions 11 and 12, the hinge portion 13 assumes the shape of a thin plate of a generally V-shaped cross-section. One end of the hinge portion 13 is connected to the first gripping portion 11, while the other end of the hinge portion 13 is connected to the second gripping portion 12. Therefore, the first and second gripping portions 11 and 12 are movably interconnected by the hinge portion 13.

Figure 2:
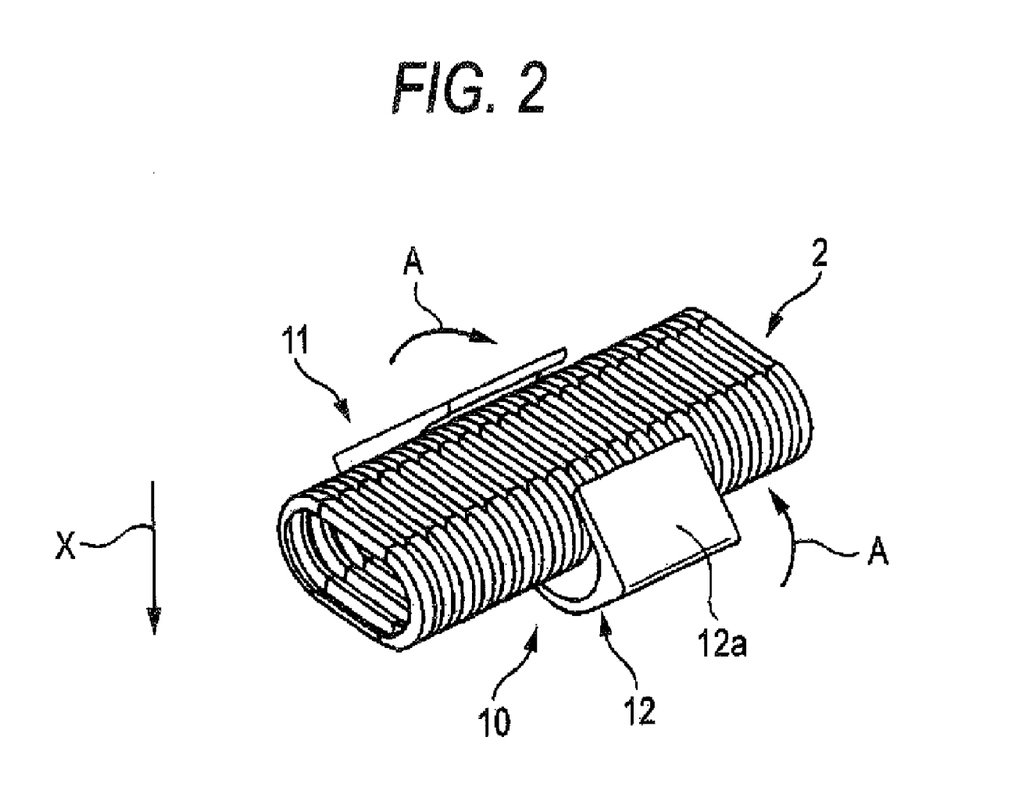
FIG. 2 is a view explanatory of a gripping operation of the gripping member of the wiring holding unit of the invention.
Figure 3:
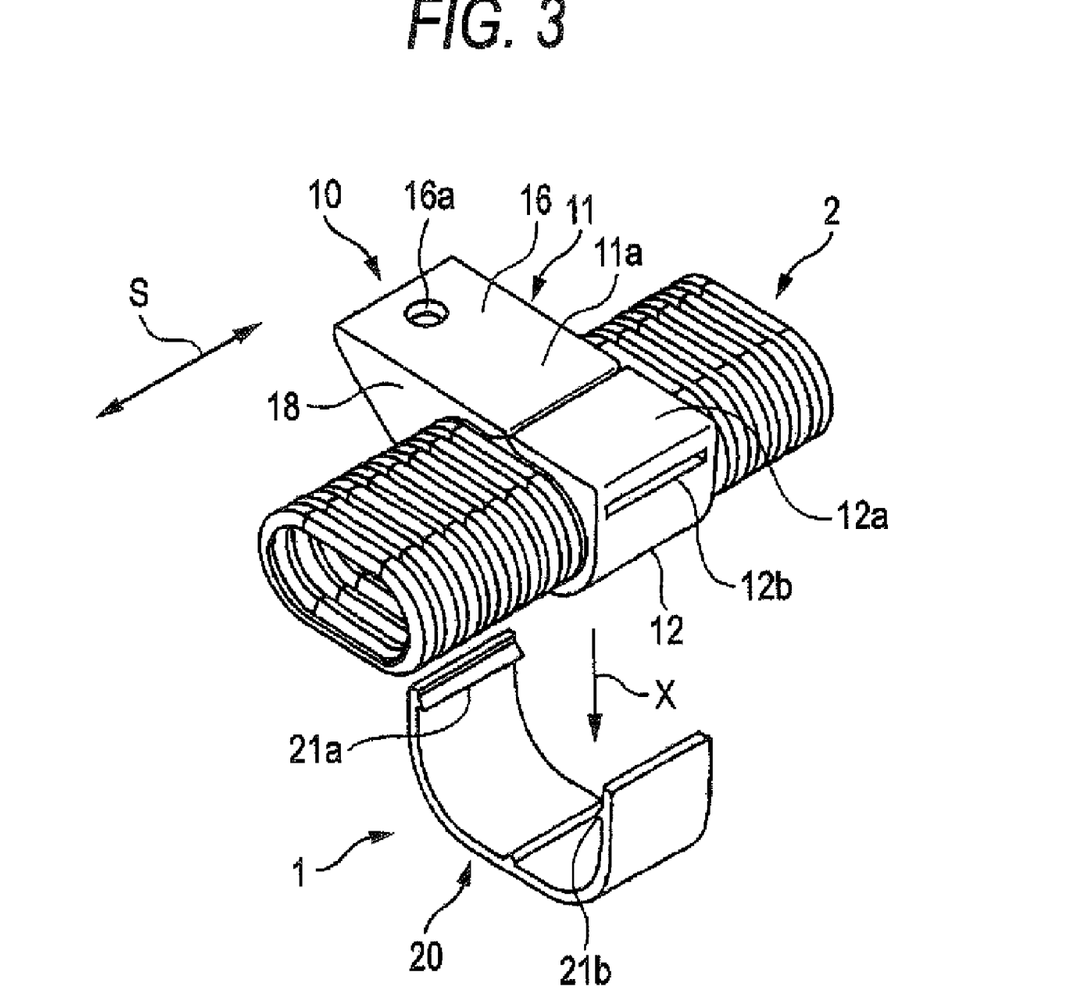
FIG. 3 is an exploded, perspective view of the wiring holding unit of the invention comprising the gripping member and a fitting/fixing member.

When the passage hole 14 is not formed by the first and second gripping portions 11 and 12, with a fixing plate member or the like disposed at their rear sides, the hinge portion 13 projects toward the passage hole 14 to form a projecting portion 13a. When the corrugated tube 2 is brought into abutting engagement with the projecting portion 13a, and then is pressed in a mounting direction X, the first and second gripping portions 11 and 12 are moved in respective gripping directions A by stresses from the above fixing plate member or the like as shown in FIG. 2, and as a result the first and second gripping portions 11 and 12 grip the corrugated tube 2 as shown in FIG. 3.

Thus, the first and second gripping portions 11 and 12 are caused to grip the corrugated tube 2 when the hinge portion 13 of the gripping member 10 is pressed by the corrugated tube 2. Therefore, merely by bringing the corrugated tube 2 into abutting engagement with the hinge portion 13 and then by pressing the corrugated tube 2, the corrugated tube 2 can be easily gripped by the gripping member 10, and therefore this wire holding unit can more easily meet a demand for an automatic production by a machine.

The gripping member 10 includes a fixing portion 16 for being fixed to a mating member 5 such as a vehicle body, a panel, etc., of a vehicle. The fixing portion 16 is formed in continuous relation to an end of the first gripping portion 11. The fixing portion 16 is formed such that when the gripping member 10 and the fitting/fixing member 20 are fitted together, the fixing portion 16 projects outwardly from the fitting/fixing member 20.

One surface 16a of the fixing portion 16 is formed such that this surface 16a and an outer peripheral surface 11a of the first gripping portion 11 jointly form a continuous flat surface. Furthermore, when the passage hole 14 is formed, the outer peripheral surface 11a of the first gripping portion 11 and an outer peripheral surface 12a of the second gripping portion 12 jointly form a continuous flat surface. Namely, the one surface 16a of the fixing portion 16 and the outer peripheral surfaces 11a and 12a jointly form a continuous flat surface, and this flat surface serves as a mounting surface 17 for mounting on the mating member 5.

An insertion hole 16b is formed through the fixing portion 16, and is disposed in the vicinity of a central portion thereof. A bolt 5a projecting from the surface of the mating member 5 can be passed through the insertion hole 16b for positioning purposes. The gripping member 10 has a pair of reinforcing portions 18, and the reinforcing portions 18 extend respectively from opposite side edges (spaced from each other in a direction S of fixing of the corrugated tube 2) of the fixing portion 16 respectively to the opposite side edges of the first gripping portion 11. In case the strength of the fixing portion 16 can be made sufficiently high, for example, by increasing the thickness thereof, the provision of the reinforcing portions 18 may be omitted.

With this construction of the gripping member 10, the mounting surface 17 of the gripping member 10, gripping the corrugated tube 2, is brought into abutting engagement with the mating member 5, while passing the bolt 5a of the mating member 5 through the insertion hole 16b of the fixing portion 16, and a nut 6 is threaded on the bolt 5a to fasten the fixing portion 16. By doing so, the gripping member 10 and hence the wiring holding unit 1 can be fixed to the mating member 5. Thus, the first gripping portion 11 of the gripping member 10 is fixed to the mating member 5 through the fixing portion 16, and therefore the more sufficient retaining force can be obtained.

In this embodiment, although the fixing portion 16 is formed only at the first gripping portion 11, two fixing portions may be formed respectively on the first and second gripping portions 11 and 12. Furthermore, taking into consideration the force of retaining of the wiring holding unit relative to the mating member 5, the mounting position of the wiring holding unit relative to the mating member 5, etc., the construction of the fixing portion 16 can be arbitrarily designed.

The fitting/fixing member 20 is separate from the gripping member 10. The fitting/fixing member 20 is in the form of a plate of a generally U-shaped cross-section conforming to the outer shape of the gripping member 10 gripping the corrugated tube 2. Namely, the fitting/fixing member 20 is so shaped as to be snugly or tightly fitted on the gripping member 10 to cover part of the first gripping portion 11, the hinge portion 13 and part of the second gripping portion 12. Since the fitting/fixing member 20 is thus in the form of a plate of a generally U-shaped cross-section, the fitting/fixing member 20 need only to be fitted on the gripping member 10, and therefore the assembling operation can be simplified.

Furthermore, the fitting/fixing member 20 can be set to such a desired thickness that it has a certain degree of resiliency, and can positively prevent the first and second gripping portions 11 and 12 from moving in respective releasing directions B opposite to the gripping directions A. Therefore, the wiring holding unit 1 can have the sufficient retaining force for retaining the corrugated tube 2.

The pair of engagement projections 21a and 21b are formed on the inner surface (which is to be opposed to the gripping member 10) of the fitting/fixing member 20, and are disposed adjacent respectively to opposite ends of the fitting/fixing member 20. The engagement projections 21a and 21b project in such an amount that they will not prevent the fitting/fixing member 20 from fitting on the gripping member 10. The engagement projections 21a and 21b have a generally triangular cross-section corresponding to the cross-section of the engagement recesses 11b and 12b. When the gripping member 10 and the fitting/fixing member 20 are completely fitted together, the engagement projections 21a and 21b are fitted respectively in the engagement recesses 11b and 12b, thereby preventing the fitting/fixing member 20 from moving in a direction away from the gripping member 10.

In this embodiment, although the engagement projections 21a and 21b and the engagement recesses 11b and 12b thus function as limitation device, the limitation device of the invention is not limited to this construction, and any other suitable form of limitation device can be used, and for example the engagement projections can be provided at the gripping member 10, while the engagement recesses can be provided at the fitting/fixing member 20.

Next, a method of assembling the above wiring holding unit 1, as well as an operation thereof, will be described.

Figure 1:
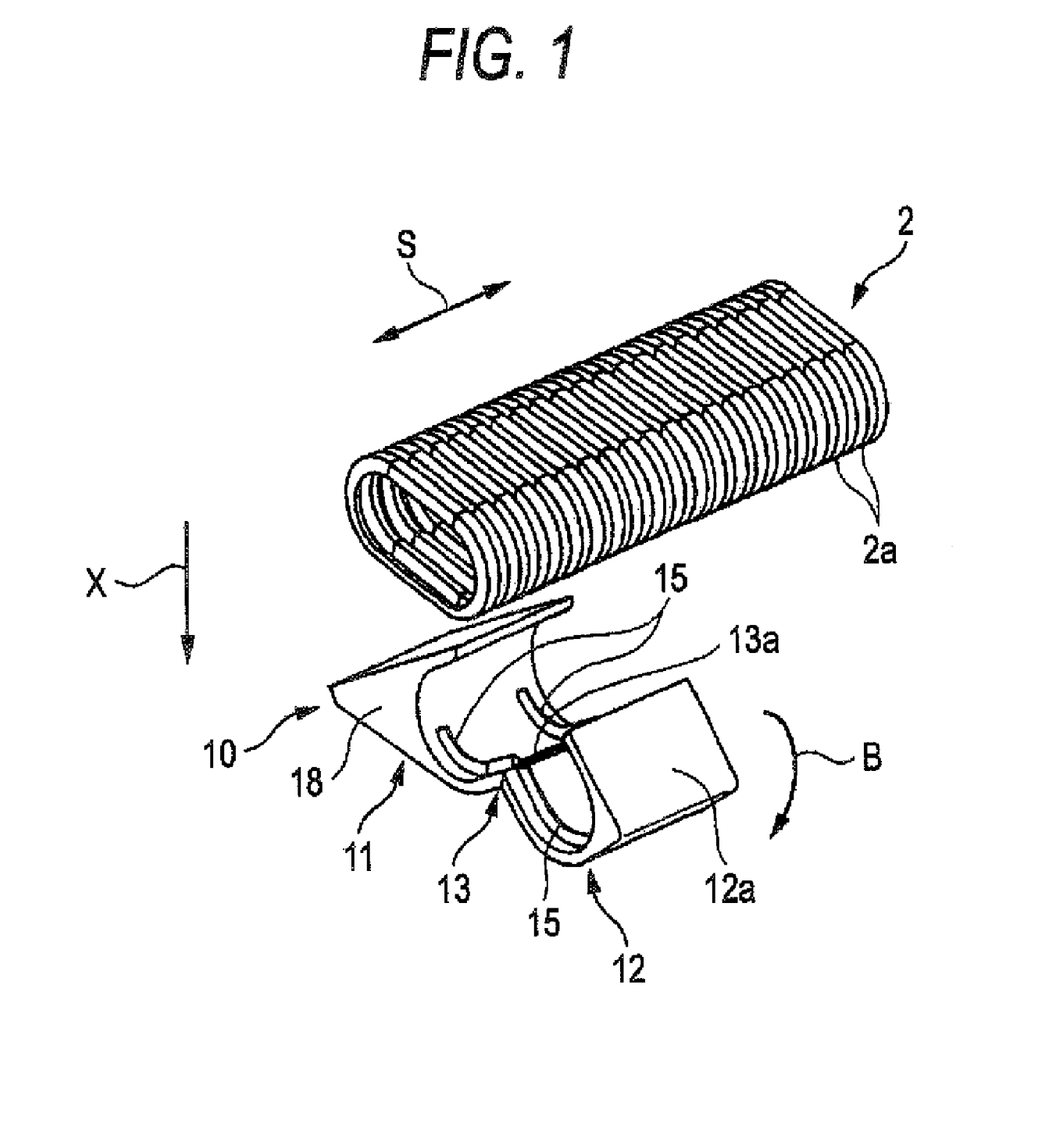
FIG. 1 is a perspective view showing a method of setting a receiving member on a gripping member of a wiring holding unit of the present invention.

When the first and second gripping portions 11 and 12 of the gripping member 10 are moved respectively in the releasing directions B as shown in FIG. 1 so that the corrugated tube 2 can be inserted in the passage hole 14, the projecting portion 13a is formed at the hinge portion 13, and also an opening is formed between the first and second gripping portions 11 and 12. Then, the corrugated tube 2 is inserted into the passage hole 14 through this opening, and is brought into abutting engagement with the projecting portion 13a of the hinge portion 13 as shown in FIG. 2.

In this condition, when the corrugated tube 2 is further pushed in the mounting direction X, a pressing force is applied to the hinge portion 13, and the first and second gripping portions 11 and 12 are moved in the respective gripping directions A by this pressing force, so that the gripping member 10 grips the corrugated tube 2 as shown in FIG. 3. At this time, the limitation projections 15 of the gripping member 10 are fitted in the grooves 2a of the corrugated tube 2.

Figure 4:
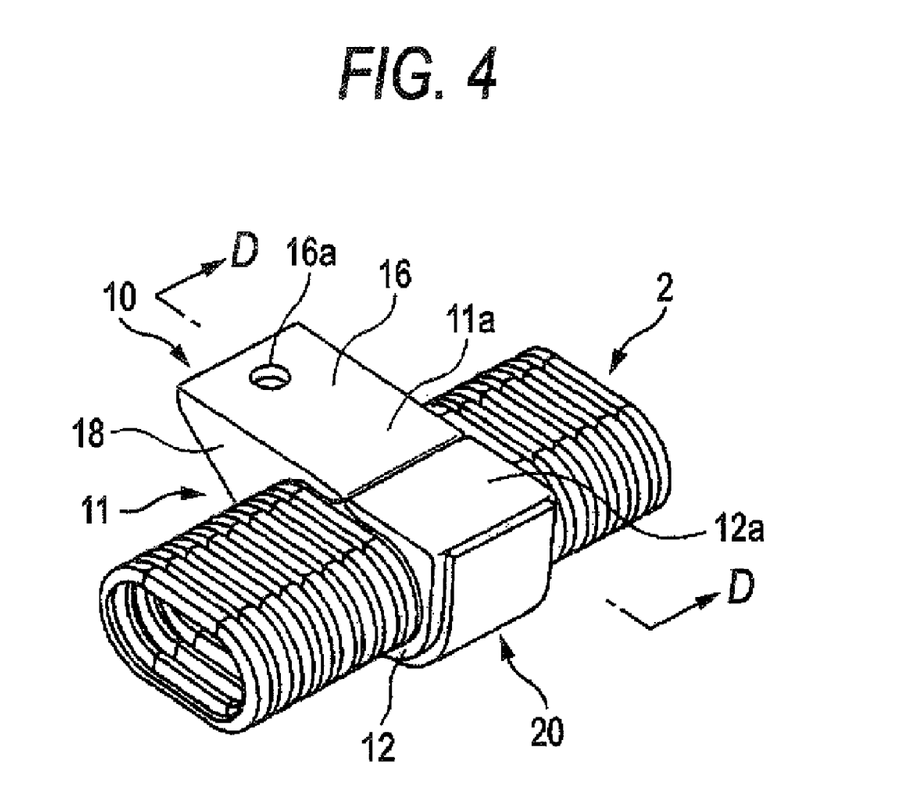
FIG. 4 is a perspective view showing a condition in which the gripping member and the fitting/fixing member of the wiring holding unit of the invention are fittingly fixed to each other.
Figure 5:
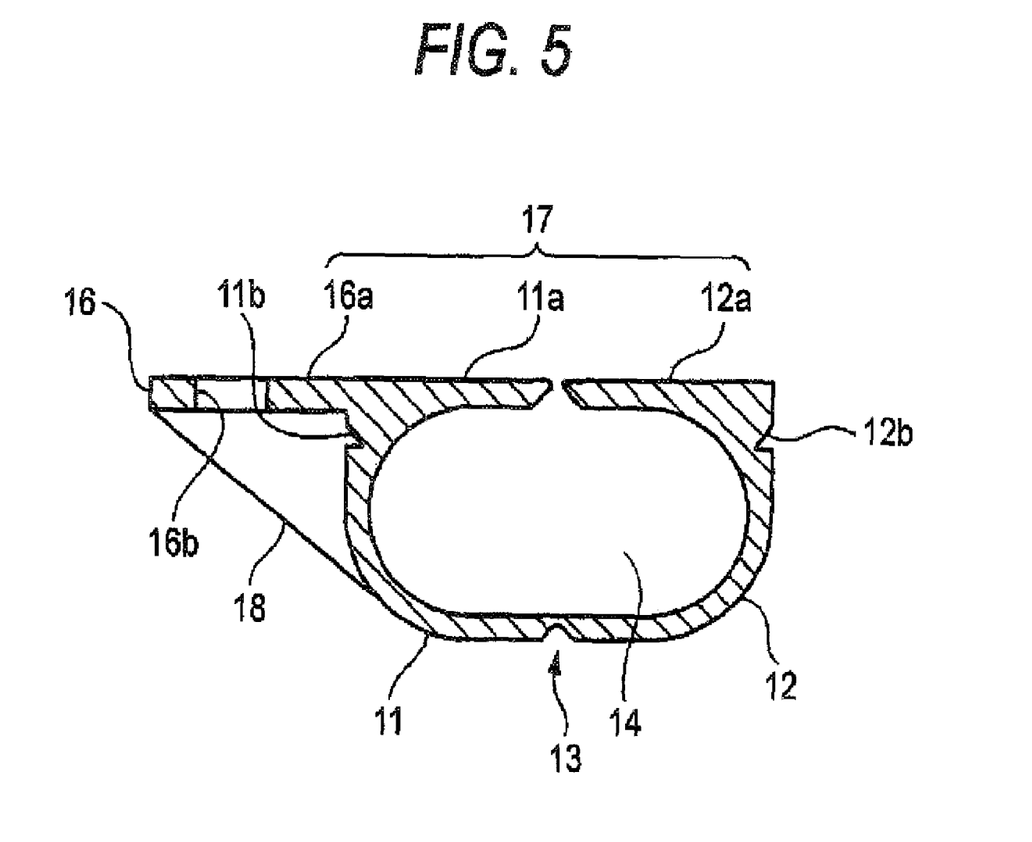
FIG. 5 is a cross-sectional view of the gripping member of the wiring holding unit of the invention.
Figure 6:
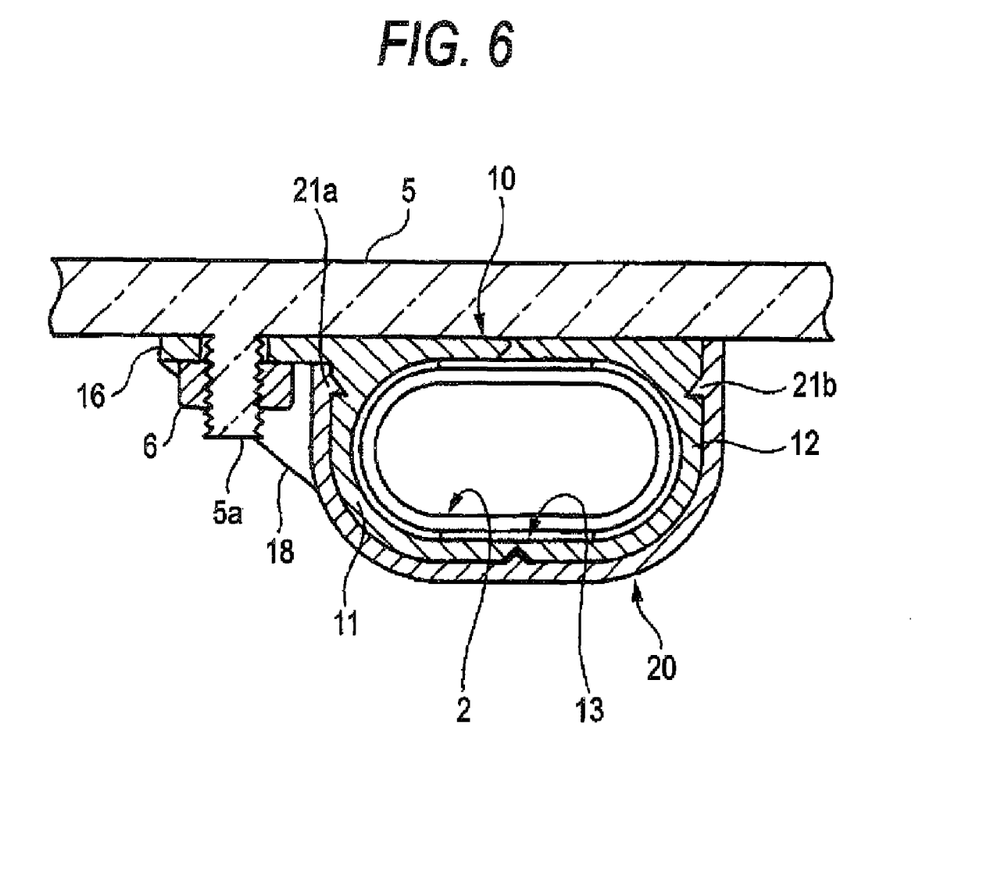
FIG. 6 is a cross-sectional view taken along the line D-D of FIG. 4.

The fitting/fixing member 20 is moved toward the gripping member 10 in a direction perpendicular to the direction S of fixing of the corrugated tube 2 gripped by the gripping member 10, and is fitted on the gripping member 10 to prevent the pair of first and second gripping portions 11 and 12 from moving in the respective releasing directions B opposite to the gripping directions A. By doing so, the gripping member 10 is fixed by the fitting/fixing member 20 as shown in FIG. 4.

For mounting the wiring holding unit 1 on the mating member 5, the mounting surface 17 is brought into abutting engagement with the mating member 5, while passing the bolt 5a of the mating member 5 through the insertion hole 16b of the fixing portion 16, and the nut 6 is threaded on the bolt 5a to fasten the fixing portion 16, thereby fixing the wiring holding unit 1 to the mating member 5.

In this embodiment, although the mounting operation is carried out using the corrugated tube 2 through which the wire harnesses are not yet passed, the invention is not limited to this method, and the mounting operation can be effected in a condition in which the wire harnesses are passed through the corrugated tube 2.

In the above wiring holding unit 1 of the invention, the pair of first and second gripping portions 11 and 12 are moved through the hinge portion 13 to grip the corrugated tube 2, and thus the corrugated tube 2 is gripped by the gripping member 10, and then the fitting/fixing member 20 is moved toward the gripping member 10 in the direction generally perpendicular to the direction S of fixing of the corrugated tube 2, and is fitted on the gripping member 10 to be fixed thereto, thereby preventing the pair of first and second gripping portions 11 and 12, gripping the corrugated tube 2, from moving in their respective releasing directions (reverse directions) B. Therefore, the direction of fitting of the gripping member 10 and the fitting/fixing member 20 relative to each other can be made the same as the direction X of mounting of the corrugated tube 2 on the gripping member 10, and therefore the corrugated tube 2, the gripping member 10 and the fitting/fixing member 20 can be automatically assembled together by the machine. And besides, the gripping member 10 is fittingly fixed by the fitting/fixing member 20, and therefore the sufficient retaining force can be obtained regardless of the diameter, cross-sectional shape, etc., of the corrugated tube 2. Therefore, there can be provided the wiring holding unit 1 which can meet the demand for the automatic production by the machine.

In the above embodiment, although the corrugated tube 2 is used as the receiving member, any other suitable form can be used, and for example, a sheath member of a wire harness (wiring) can be used as a receiving member, in which case the use of the corrugated tube 2 is omitted.

What is claimed is:

1. A wiring holding unit for holding a receiving member receiving wiring therein, the wiring holding unit comprising:
   a pair of substantially rigid gripping portions for gripping said receiving member;
   a hinge portion interconnecting said pair of rigid gripping portions such that said gripping portions are movable relative to one another between a first position where said gripping portions are brought into opposed relation to one another and jointly formed a passage hole for passage of said receiving member therethrough and a second position where said gripping portions are brought apart from one another for insertion of the receiving member therebetween;
   a plate being a single piece having a substantially U-shaped cross section that conforms to an outer shape of said gripping portions when said gripping portions are in said first position and which is separate from said gripping portions and said hinge portion;
   an engagement projection disposed at one of an inner surface of each end of the plate and an outer surface of each gripping portion; and
   an engagement recess disposed at the other of the inner surface of each end of the plate and the outer surface of each gripping portion,
   wherein the plate is fitted on and covers said hinge portion and a part of each of said gripping portions when said gripping portions are in said first position, thereby preventing said pair of gripping portions from moving toward said second position, wherein once the plate is slid onto the gripping portions, the plate retains its U-shape, and wherein the engagement projections fit into the respective engagement recesses when the gripping portions are in the first position.

2. A wiring holding unit for holding a receiving member receiving wiring therein, the wiring holding unit comprising:

a pair of substantially rigid gripping portions for gripping said receiving member;

a hinge portion interconnecting said pair of rigid gripping portions such that said gripping portions are movable relative to one another between a first position where said gripping portions are closed in opposed relation to one another and jointly formed a passage hole for passage of said receiving member therethrough and a second position where said gripping portions are apart from one another for insertion of the receiving member therebetween; and a plate being a single piece having a substantially U-shaped cross section that conforms to an outer shape of said gripping portions when said gripping portions are in said first position and which is separate from said gripping portions and said hinge portion, wherein the plate is fitted on and covers said hinge portion and a part of each of said gripping portions when said gripping portions are in said first position, thereby preventing said pair of gripping portions from moving toward said second position, wherein once the plate is slid onto the gripping portions, the plate retains its U-shape, and wherein when the gripping portions are in said second position, the hinge portion projects inwardly toward said passage hole, whereby when said receiving member is brought into abutting engagement with and pressed into said hinge portion, the gripping portions are moved into said first position to grip said receiving member.

3. A wiring holding unit according to claim 1, wherein one of said gripping portions includes a fixing portion that projects outwardly relative to said plate when said gripping portions are in said first position for fixing said unit to a mating surface.

4. A wiring holding unit according to claim 1, wherein the plate is flexible and is dimensioned to retain itself over the gripping portions.

5. A wiring holder unit according to claim 1, wherein the plate does not entirely surround the gripping portions.

* * * * *